(12) United States Patent
Crabtree et al.

(10) Patent No.: US 11,757,872 B2
(45) Date of Patent: Sep. 12, 2023

(54) CONTEXTUAL AND RISK-BASED MULTI-FACTOR AUTHENTICATION

(71) Applicant: QOMPLX, Inc., Tysons, VA (US)

(72) Inventors: Jason Crabtree, Vienna, VA (US);
Andrew Sellers, Monument, CO (US);
Ian MacLeod, Arlington, VA (US)

(73) Assignee: QOMPLX, INC., Tysons, VA (US)

( * ) Notice: Subject to any disclaimer, the term of this patent is extended or adjusted under 35 U.S.C. 154(b) by 0 days.

(21) Appl. No.: 17/539,137

(22) Filed: Nov. 30, 2021

(65) Prior Publication Data

US 2022/0232006 A1    Jul. 21, 2022

Related U.S. Application Data

(63) Continuation of application No. 16/856,827, filed on Apr. 23, 2020, now Pat. No. 11,218,474, which is a continuation of application No. 15/790,860, filed on Oct. 23, 2017, now Pat. No. 10,742,647, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No.15/206,195, filed on Jul. 8, 2016, now abandoned, which is a continuation-in-part of application No. 15/186,453, filed on Jun. 18, 2016, now abandoned,
(Continued)

(51) Int. Cl.
*H04L 43/04*     (2022.01)
*H04L 9/40*      (2022.01)

(52) U.S. Cl.
CPC .......... *H04L 63/0861* (2013.01); *H04L 43/04* (2013.01); *H04L 63/083* (2013.01); *H04L 63/0876* (2013.01); *H04L 63/105* (2013.01); *H04L 63/1433* (2013.01); *H04L 63/1408* (2013.01); *H04L 2463/082* (2013.01)

(58) Field of Classification Search
USPC ............ 726/7, 2, 21, 36; 713/150, 163, 181; 380/255, 264, 276
See application file for complete search history.

(56) References Cited

U.S. PATENT DOCUMENTS 6,256,544 B1 *   7/2001   Weissinger ........ G05B 19/0421
                                                    700/1
7,171,515 B2 *   1/2007   Ohta ..................... G06F 12/127
                                                    711/E12.076
(Continued)

FOREIGN PATENT DOCUMENTS

WO    2014159150 A1    10/2014
WO    2017075543 A1    5/2017

*Primary Examiner* — Sharif E Ullah
(74) *Attorney, Agent, or Firm* — Galvin Patent Law LLC; Brian R. Galvin

(57) ABSTRACT

A system for contextual and risk-based multi-factor authentication having a multi-dimensional time series data server configured to monitor and record a network's traffic data and to serve the traffic data to other modules and a directed computation graph module configured to receive network traffic data from the multi-dimensional time series data server, determine a network traffic baseline from the network traffic data, and determine a verification score needed before granting access based at least in part by the network traffic baseline. A plurality of verification methods build up a user's verification score to required level to gain access.

7 Claims, 11 Drawing Sheets

Related U.S. Application Data which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/616,427 is a continuation-in-part of application No. 14/925,974, filed on Oct. 28, 2015.

(60) Provisional application No. 62/574,708, filed on Oct. 19, 2017.

(56) References Cited

U.S. PATENT DOCUMENTS

| | | | | |
|---|---|---|---|---|
| 7,530,105 | B2* | 5/2009 | Gilbert | H04L 63/1425 709/227 |
| 8,832,840 | B2* | 9/2014 | Zhu | G06F 21/577 726/25 |
| 9,256,735 | B2* | 2/2016 | Stute | H04L 63/1425 |
| 9,560,065 | B2* | 1/2017 | Neil | H04L 63/1425 |
| 10,216,485 | B2* | 2/2019 | Misra | H04L 41/5096 |
| 2003/0033526 | A1* | 2/2003 | French | H04L 63/105 713/168 |
| 2005/0000165 | A1* | 1/2005 | Dischinat | E06B 7/23 49/496.1 |
| 2007/0226796 | A1* | 9/2007 | Gilbert | G06F 21/577 726/25 |
| 2013/0111592 | A1* | 5/2013 | Zhu | G06F 21/577 726/25 |
| 2013/0117852 | A1* | 5/2013 | Stute | H04L 63/1425 726/23 |
| 2014/0250153 | A1* | 9/2014 | Nixon | G06F 16/22 707/812 |
| 2014/0359552 | A1* | 12/2014 | Misra | H04L 41/5096 717/100 |
| 2015/0020199 | A1* | 1/2015 | Neil | H04L 63/1408 726/23 |
| 2016/0006629 | A1* | 1/2016 | Ianakiev | G06F 21/85 709/224 |
| 2016/0275123 | A1* | 9/2016 | Lin | G06F 9/5083 |
| 2023/0035505 | A1* | 2/2023 | Olds | G06Q 30/0209 |

* cited by examiner

CONTEXTUAL AND RISK-BASED MULTI-FACTOR AUTHENTICATION

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/856,827
Ser. No. 15/790,860
62/574,708
Ser. No. 15/616,427
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 14/925,974

BACKGROUND OF THE INVENTION

Field of the Invention

The disclosure relates to the field of network security, particularly to multi-factor user authentication.

Discussion of the State of the Art

Multi-factor authentication (MFA) is widely used today as an additional verification step often used in conjunction with a traditional login and password as a way to further secure a user's online accounts. MFA methods commonly used today includes one-time use codes sent to a user's mobile device or email, confirming through a uniquely generated link sent to the user, or using authenticator devices and apps that generate a code on-demand. However, the system is not without its faults. One such fault is over-reliance on a single method of delivery. For example, once a user's email is compromised, it may be trivial to gain access to that user's other accounts by simply requesting a password reset, which are usually conducted through the user's email. One-time use codes, such as those from banking websites, are also often sent to the user's email address.

What is needed is a system that uses a combination of verification methods so that over-reliance on a single, and possibly compromised, method is eliminated. Such a system should be able to dynamically determine the varying amounts of verification needed, based on the context and risks associated with the connection.

SUMMARY OF THE INVENTION

Accordingly, the inventor has conceived, and reduced to practice, a system and method for contextual and risk-based multi-factor authentication.

In a typical embodiment, a server may be configured to dynamically determine a necessary verification score that must be obtained by a user before the user may access requested resources. The score may be based on context and risks associated with the connection request, such as, connection origin, how unusual the connection request is determined to be by the server, and the like. The user may then collect verification points via a plurality of verification methods to gain access.

According to one aspect of the invention, a system for contextual and risk-based multi-factor authentication is provided, comprising a multi-dimensional time series data server comprising a memory, a processor, and a plurality of programming instructions stored in the memory thereof and operable on the processor thereof, wherein the programmable instructions, when operating on the processor, cause the processor to monitor and record a network's traffic data, and serve the traffic data to other modules; and a directed computation graph module comprising a memory, a processor, and a plurality of programming instructions stored in the memory thereof and operable on the processor thereof, wherein the programmable instructions, when operating on the processor, cause the processor to receive traffic data from the multi-dimensional time series data server, determine a network traffic baseline from the traffic data, and determine a required verification score needed before granting access by a user to a network resource based at least in part by the network traffic baseline; wherein the user uses the plurality of verification methods to build up the required verification score in order to gain access to the network resource.

According to another embodiment, the verification score is based at least in part by a security-level associated with resources being accessed by the user. According to another embodiment, the verification score is based at least in part by the origin of the user's connection. According to another embodiment, at least a portion of the verification methods verifies visual media pertaining to the user. According to another embodiment, at least a portion of the verification methods checks and verifies biometric features of the user. According to another embodiment, at least a portion of the verification methods used are based on information obtained from untrusted parties. According to another embodiment, at least a portion of the verification methods used are based on information pertaining to the user's device.

According to another aspect of the invention, a method for contextual and risk-based multi-factor authentication is provided, comprising the steps of: (a) monitoring and recording a network's traffic data, with a multi-dimensional time series data server; (b) serving the traffic data to other modules, with the multi-dimensional time series data server; (c) receiving the traffic data from the multi-dimensional time series data server, with a directed computation graph module; (d) determining a network traffic baseline from the traffic data, with the directed computation graph module; (e) determining a required verification score needed before granting access by a user to network resource based at least in part by the network traffic baseline, with the directed computation graph module; and (f) requiring a user to use a plurality of verification methods to earn enough verification score in order to gain access to the network resource.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
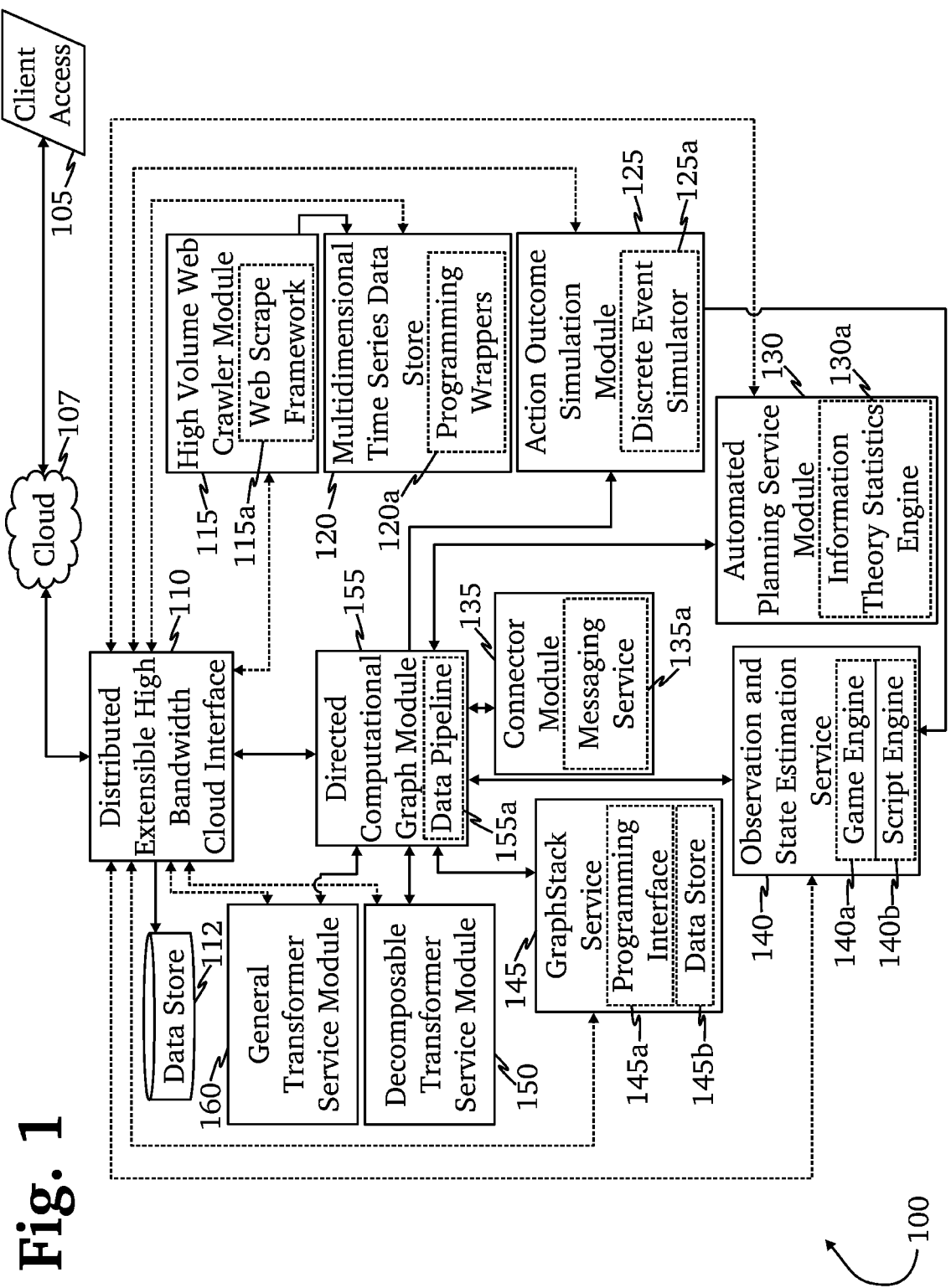
FIG. 1 is a diagram of an exemplary architecture of a business operating system according to an embodiment of the invention.

The inventor has conceived, and reduced to practice, a system and method for contextual and risk-based multi-factor authentication.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a diagram of an exemplary architecture of a business operating system 100 according to an embodiment of the invention. Client access to network resource or system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and a graph stack service 145. Directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within directed computational graph module 155, data may be split into two identical streams in a specialized pre-programmed data pipeline 155a, wherein one sub-stream may be sent for batch processing and storage while the other sub-stream may be reformatted for transformation pipeline analysis. The data may be then transferred to a general transformer service module 160 for linear data transformation as part of analysis or the decomposable transformer service module 150 for branching or iterative transformations that are part of analysis. Directed computational graph module 155 represents all data as directed graphs where the transformations are nodes and the result messages between transformations edges of the graph. High-volume web crawling module 115 may use multiple server hosted preprogrammed web spiders which, while autonomously configured, may be deployed within a web scraping framework 115a of which SCRAPY™ is an example, to identify and retrieve data of interest from web based sources that are not well tagged by conventional web crawling technology. Multiple dimension time series data store module 120 may receive streaming data from a large plurality of sensors that may be of several different types. Multiple dimension time series data store module 120 may also store any time series data encountered by system 100 such as, but not limited to, environmental factors at insured client infrastructure sites, component sensor readings and system logs of some or all insured client equipment, weather and catastrophic event reports for regions an insured client occupies, political communiques and/or news from regions hosting insured client infrastructure and network service information captures (such as, but not limited to, news, capital funding opportunities and financial feeds, and sales, market condition), and service related customer data. Multiple dimension time series data store module 120 may accommodate irregular and high-volume surges by dynamically allotting network bandwidth and server processing channels to process the incoming data. Inclusion of programming wrappers 120a for languages—examples of which may include, but are not limited to, C++, PERL, PYTHON, and ERLANG™—allows sophisticated programming logic to be added to default functions of multidimensional time series database 120 without intimate knowledge of the core programming, greatly extending breadth of function. Data retrieved by multidimensional time series database 120 and high-volume web crawling module 115 may be further analyzed and transformed into task-optimized results by directed computational graph 155 and associated general transformer service 160 and decomposable transformer service 150 modules. Alternately, data from the multidimensional time series database and high-volume web crawling modules may be sent, often with scripted cuing information determining important vertices 145a, to graph stack service module 145 which, employing standardized protocols for converting streams of information into graph representations of that data, for example open graph internet technology (although the invention is not reliant on any one standard). Through the steps, graph stack service module 145 represents data in graphical form influenced by any pre-determined scripted modifications 145a and stores it in a graph-based data store 145b such as GIRAPH™ or a key-value pair type data store REDIS™, or RIAK™, among others, any of which are suitable for storing graph-based information.

Results of the transformative analysis process may then be combined with further client directives, additional business rules and practices relevant to the analysis and situational information external to the data already available in automated planning service module 130, which also runs powerful information theory-based predictive statistics functions and machine learning algorithms 130a to allow future trends and outcomes to be rapidly forecast based upon the current system derived results and choosing each a plurality of possible business decisions. Then, using all or most available data, automated planning service module 130 may propose business decisions most likely to result in favorable business outcomes with a usably high level of certainty. Closely related to the automated planning service module 130 in the use of system-derived results in conjunction with possible externally supplied additional information in the assistance of end user business decision making, action outcome simulation module 125 with a discrete event simulator programming module 125a coupled with an end user-facing observation and state estimation service 140, which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

Figure 2:
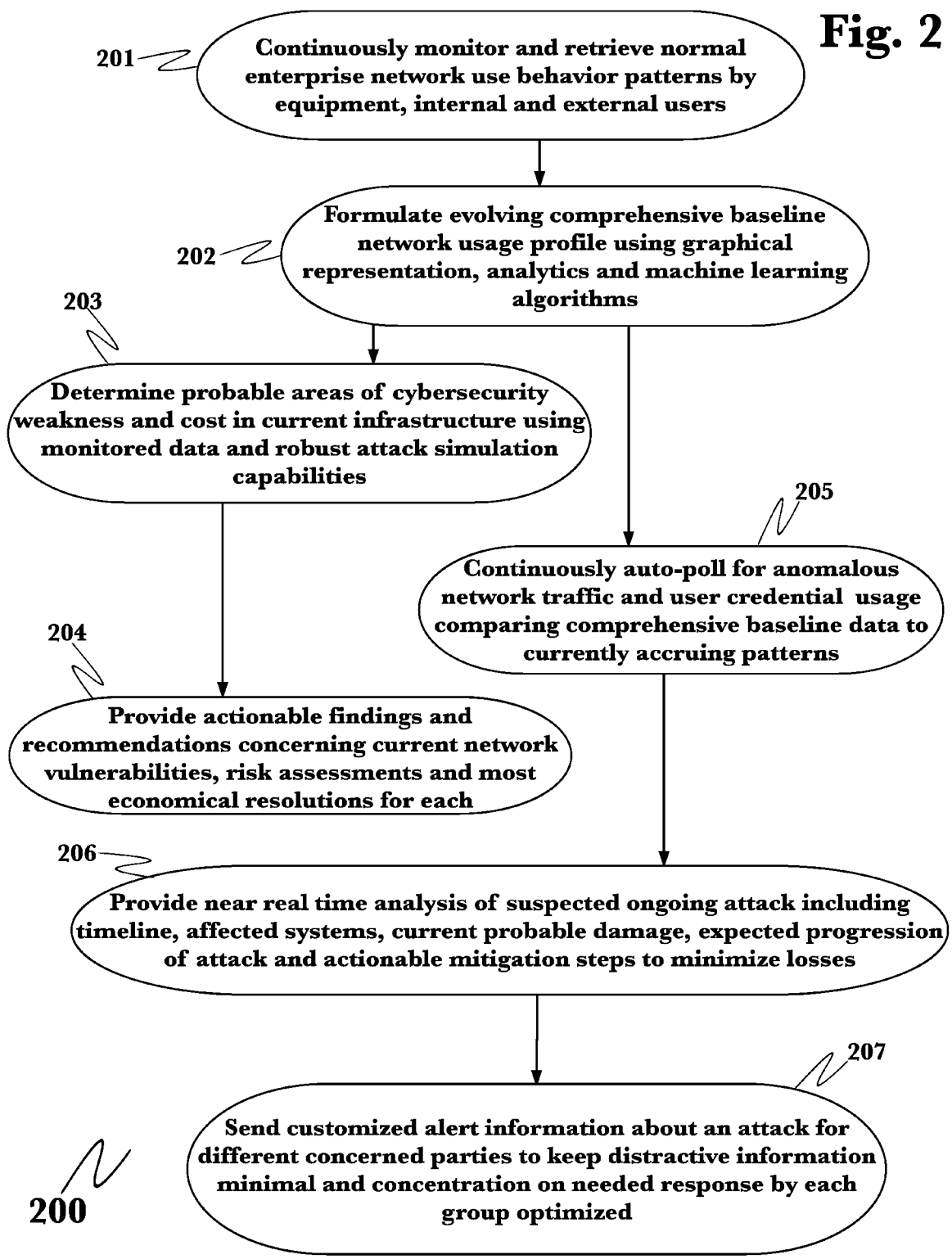
FIG. 2 is a flow diagram of an exemplary function of the business operating system in the detection and mitigation of predetermining factors leading to and steps to mitigate ongoing cyberattacks.

FIG. 2 is a flow diagram of an exemplary function 200 of the business operating system in the detection and mitigation of predetermining factors leading to and steps to mitigate ongoing cyberattacks. The system continuously retrieves network traffic data, at step 201, which may be stored and preprocessed by the multidimensional time series data store 120 and its programming wrappers 120a. All captured data are then analyzed to predict the normal usage patterns of network nodes such as internal users, network connected systems and equipment and sanctioned users external to the enterprise boundaries for example off-site employees, contractors and vendors, just to name a few likely participants.

Of course, normal other network traffic may also be known to those skilled in the field, the list given is not meant to be exclusive and other possibilities would not fall outside the design of the invention. Analysis of network traffic may include graphical analysis of parameters such as network item to network usage using specifically developed programming in the graphstack service 145, 145*a*, analysis of usage by each network item may be accomplished by specifically predeveloped algorithms associated with the directed computational graph module 155, general transformer service module 160 and decomposable service module 150, depending on the complexity of the individual usage profile at step 201. These usage pattern analyses, in conjunction with additional data concerning an enterprise's network topology; gateway firewall programming; internal firewall configuration; directory services protocols and configuration; and permissions profiles for both users and for access to network resources and/or sensitive information, just to list a few non-exclusive examples may then be analyzed further within the automated planning service module 130, where machine learning techniques which include but are not limited to information theory statistics 130*a* may be employed and the action outcome simulation module 125, specialized for predictive simulation of outcome based on current data 125*a* may be applied to formulate a current, up-to-date and continuously evolving baseline network usage profile at step 202. This same data would be combined with up-to-date known cyberattack methodology reports, possibly retrieved from several divergent and exogenous sources through the use of the multi-application programming interface aware connector module 135 to present preventative recommendations to the enterprise decision makers for network infrastructure changes, physical and configuration-based to cost effectively reduce the probability of a cyberattack and to significantly and most cost effectively mitigate data exposure and loss in the event of attack at steps 203 and 204.

While some of these options may have been partially available as piecemeal solutions in the past, we believe the ability to intelligently integrate the large volume of data from a plurality of sources on an ongoing basis followed by predictive simulation and analysis of outcome based upon that current data such that actionable, business practice efficient recommendations can be presented is both novel and necessary in this field.

Once a comprehensive baseline profile of network usage using all available network traffic data has been formulated, the specifically tasked business operating system continuously polls the incoming traffic data for activities anomalous to that baseline as determined by pre-designated boundaries at step 205. Examples of anomalous activities may include a user attempting to gain access several network resources such as workstations or servers in rapid succession, or a user attempting to gain access to a domain server of server with sensitive information using random userIDs or another user's userID and password, or attempts by any user to brute force crack a privileged user's password, or replay of recently issued ACTIVE DIRECTORY™/Kerberos ticket granting tickets, or the presence on any known, ongoing exploit on the network or the introduction of known malware to the network, just to name a very small sample of the cyberattack profiles known to those skilled in the field. The invention, being predictive as well as aware of known exploits is designed to analyze any anomalous network behavior, formulate probable outcomes of the behavior, and to then issue any needed alerts regardless of whether the attack follows a published exploit specification or exhibits novel characteristics deviant to normal network practice. Once a probable cyberattack is detected, the system then is designed to get needed information to responding parties at step 206, and tailored, where possible, to each role in mitigating the attack and damage arising from it at step 207. This may include the exact subset of information included in alerts and updates and the format in which the information is presented which may be through the enterprise's existing security information and event management system. Network administrators, then, might receive information such as but not limited to where on the network the attack is believed to have originated, what systems are believed currently affected, predictive information on where the attack may progress, what enterprise information is at risk and actionable recommendations on repelling the intrusion and mitigating the damage, whereas a chief information security officer may receive alert including but not limited to a timeline of the cyberattack, the services and information believed compromised, what action, if any has been taken to mitigate the attack, a prediction of how the attack may unfold and the recommendations given to control and repel the attack at step 207, although all parties may access any network resources and cyberattack information for which they have granted access at any time, unless compromise is suspected. Other specifically tailored updates may be issued by the system at steps 206 and 207.

Figure 3:
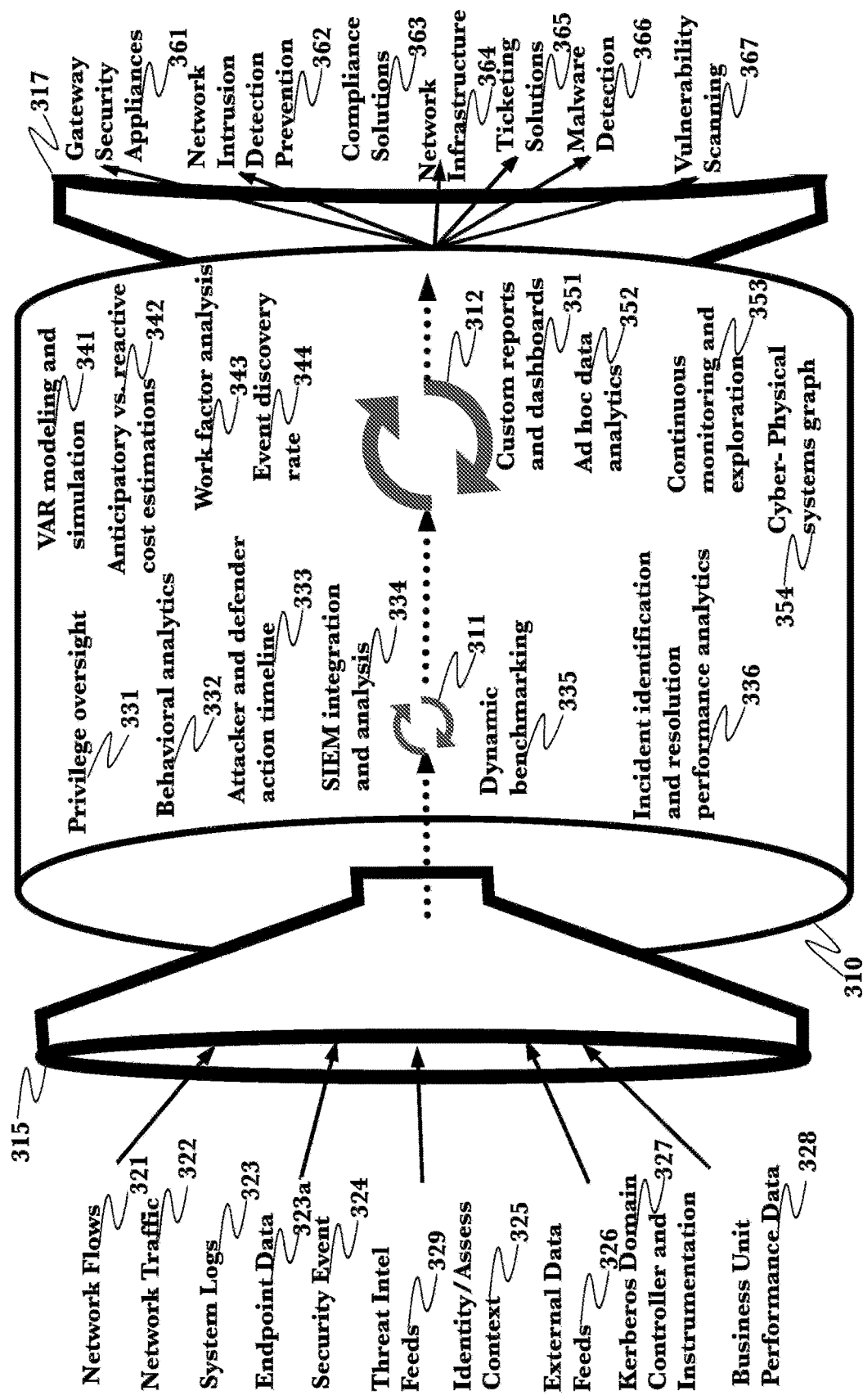
FIG. 3 is a process diagram showing business operating system functions in use to mitigate cyberattacks.

FIG. 3 is a process diagram showing business operating system functions 300 in use to mitigate cyberattacks. Input network data which may include network flow patterns 321, the origin and destination of each piece of measurable network traffic 322, system logs from servers and workstations on the network 323, endpoint data 323*a*, any security event log data from servers or available security information and event (SIEM) systems 324, identity and assessment contexts 325, external network health or cybersecurity feeds 326, Kerberos domain controller or ACTIVE DIRECTORY™ server logs or instrumentation 327, business unit performance related data 328, and external threat intelligence feeds 329, among many other possible data types for which the invention was designed to analyze and integrate, may pass into 315 the business operating system 310 for analysis as part of its cyber security function. These multiple types of data from a plurality of sources may be transformed for analysis 311, 312 using at least one of the specialized cybersecurity, risk assessment or common functions of the business operating system in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the business operating system's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, and perform one time or continuous vulnerability scanning depending on client directives 367. These examples are, of course, only a subset of the possible uses of the system, they are exemplary in nature and do not reflect any boundaries in the capabilities of the invention.

Figure 4:
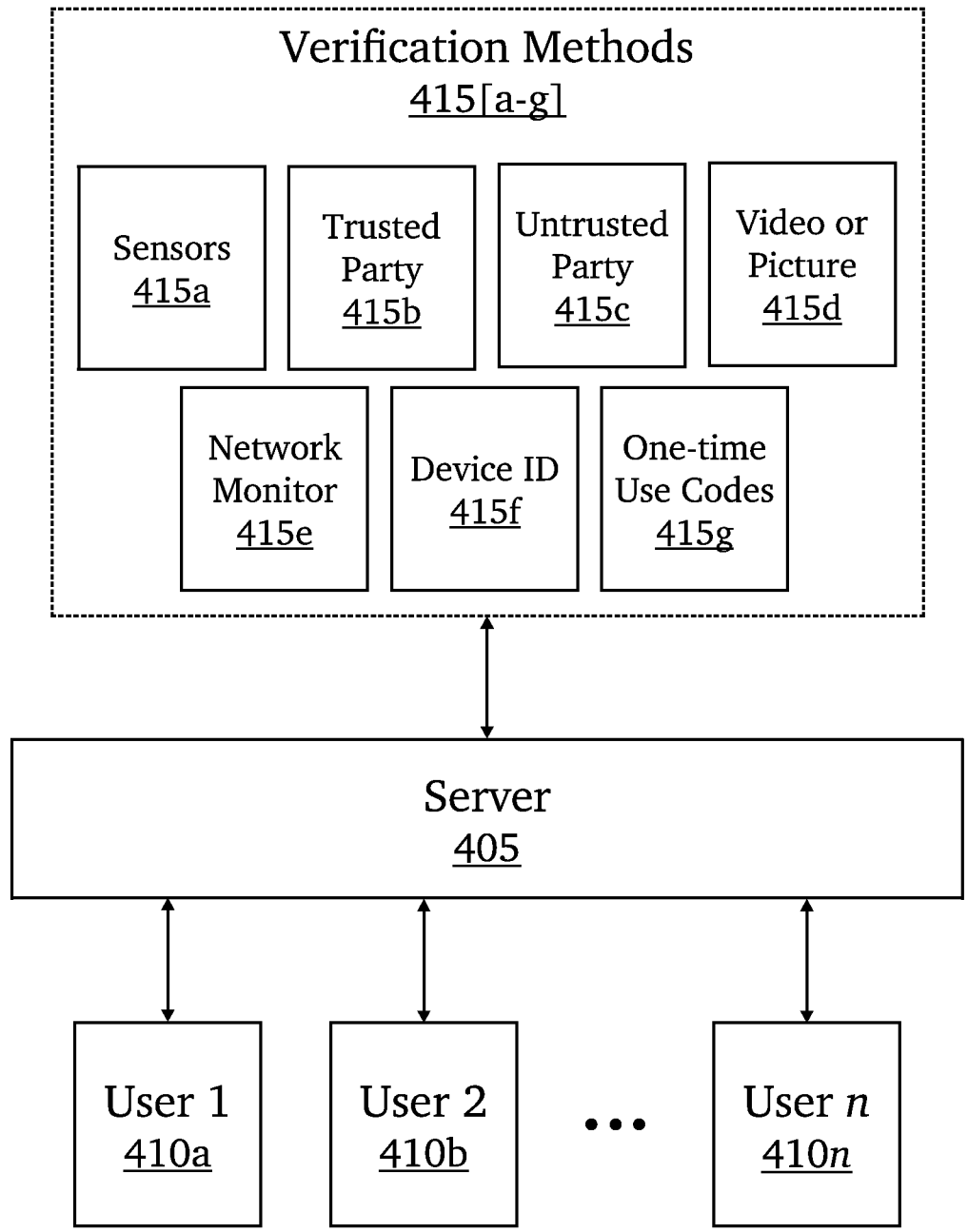
FIG. 4 is an illustration of an example architecture system used for contextual and risk-based multi-factor authentication as used in various embodiments of the present invention.

Along with the features discussed above, business operating system 100 functions may be configured to operate as a server that utilizes contextual and risk-based multi-factor authentication. FIG. 4 is an illustration of an example architecture system 400 used for contextual and risk-based multi-factor authentication as used in various embodiments of the present invention. System 400 comprises a server 405, a plurality of users 410[a-n], and a plurality of verification methods 415[a-g]. Although, system 400 illustrates a direct connection between users and server, it should be understood that this is not indicative of a limitation of the system. Server 405 may be an authentication server for security device, such as a badge reader or biometric scanner or a security terminal, that may need to check a database on the server. Examples may include initiating a peer-to-peer connection, accessing a protected computer, gaining access to restricted physical locations, or the like. For simplicity, intermediate security devices are omitted in the examples used in the present disclosure.

In system 400, users 410[a-n], connects to server 405. In addition to a primary authentication method, such as a user identification and password, the user may be required to undergo additional verification. Server 405 may be configured to run business operating system 100, and further configured to dynamically determine a required verification score based at least on the circumstances of the connection before granting access to the user. Circumstances that may affect the score may include, but is not limited to, origin of the user's connection, whether the access request is determined to be anomalous using the cybersecurity functions of business operating system 100, accessing files or drives with a higher-level security assignment, and the like. Verification points may be abstained via one or more verification methods 415[a-g], which may include, without limitation, sensors 415a, trusted parties 415b, untrusted parties 415c, video or picture 415d, network monitoring 415e, device ID 415f, and one-time-use codes 415g.

To provide to some specific examples of the various verification methods, sensors 415a may include biometrics scans, such as fingerprint scan, iris scan, facial recognition, and the like; voice recognition; and employee badge scanning using some near-field technology such as radio-frequency identification (RFID), or near field communication (NFC). Sensors may be sensors built into a user's mobile device, or it may be installed semi-permanently at a secure location, for example, at a security desk at an office.

Trusted parties 415b may include a user's co-worker or security personnel that may have received a request by server 405 during the additional verification step to verify whether the user requesting access is actually the user, and not a malicious party. For example, a user may request access from a server, and once the server requires additional verification it may send an alert to a random co-worker in the proximity of the user. The co-worker may verify, for example, with their own badge scanner or biometric scanner, or taking and submitting a photograph or video.

Untrusted parties 415c may be verification via a third party not normally associated with the user. For example, the third party may be a member of a rewards program incentivizing submission of pictures, posting comments, or the like at the request of the server. The rewards program may additionally be disguised so that it may appear as a simple activity the third party may participate in to earn rewards without overtly making it a means of verifying the user. For example, the rewards program may be disguised as an augmented reality game that requests players to submitting pictures and videos, or commenting on their surroundings to earn points. Penalties may also be implemented to deter wrongful verification by untrusted parties.

Video or picture 415d may include videos or pictures taken with the camera on a laptop, desktop computer, or mobile device; cameras installed at secure locations at an office; video or pictures taken by an autonomous drone sent by the server; or the like.

Network monitoring 415e may be passive verification by the server based on information regarding the connection requesting access, and analyzed using the cybersecurity functions of business operating system 100. Such information may include, for instance, access or traffic compared to a pre-established network baseline, origin of the user connection, time of access request, and the like. For example, a user connecting from within an office, perhaps determined through determining the IP address of the user, during normal work hours may be provided more verification points during verification than a user who is connecting using an airport's Wi-Fi network during odd hours.

Device ID 415f may be another passive verification by the server that takes into account the user's connecting device, such as, a MAC address, or a device fingerprint generated by the server based on the hardware and software configuration of the user's device.

One-time-use codes 415g may be uniquely generated codes that are sent to the user through a text message or email, or generated on-demand on the user's mobile device. The code may also take the form of a uniquely generated hyperlink that the user may simply click on to verify. Various implementations of the one-time-use code are presently used in the art.

The various verification methods may be configured so that each method may grant different amounts of verification points based on metrics defined by the user, such as how secure the method is. For example, a badge reader at an office that has a security personnel keeping watch may grant the user more points than a fingerprint scan on a mobile device.

Figure 5:
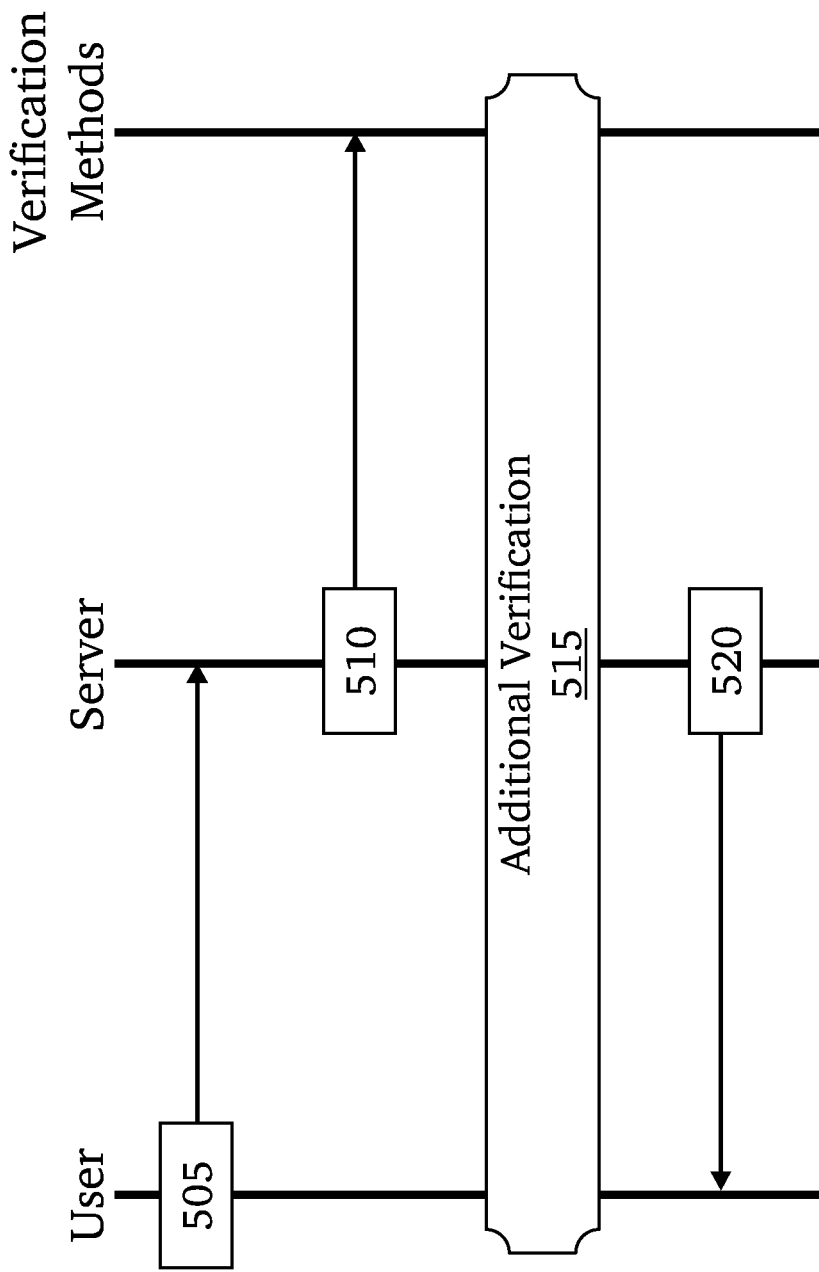
FIG. 5 is a sequence flow diagram summarizing one method for a user to connect to a server used in various embodiments of the invention.

FIG. 5 is a sequence flow diagram summarizing one method 500 for a user to connect to a server used in various embodiments of the invention. For the purposes of this sequence flow diagram, it will be presumed that the user is successfully verified at all authentication and verification steps. At an initial step 505, a user requests access from a server. The server may prompt the user for some initial form of authentication, such as a login and password. At step 510, the server dynamically determines a verification score required for the user to be granted access. At step 515, the server may request that the user use a plurality of verification methods to reach the verification score needed before access is granted. The various verification methods are discussed above in system 400. Depending on the verification method used, the method may be initiated by either the user or the server. Once verification is successful, the user is granted access by the server at step 520. In some embodiments, instead of using points, the system may be configured to require a certain number of verification methods to be used, or requiring a particular verification method to be used in conjunction with a number of other verification methods. Other embodiments may use a combination of the points-based system, and the method-count system.

DETAILED DESCRIPTION OF EXEMPLARY ASPECTS

Figure 6:
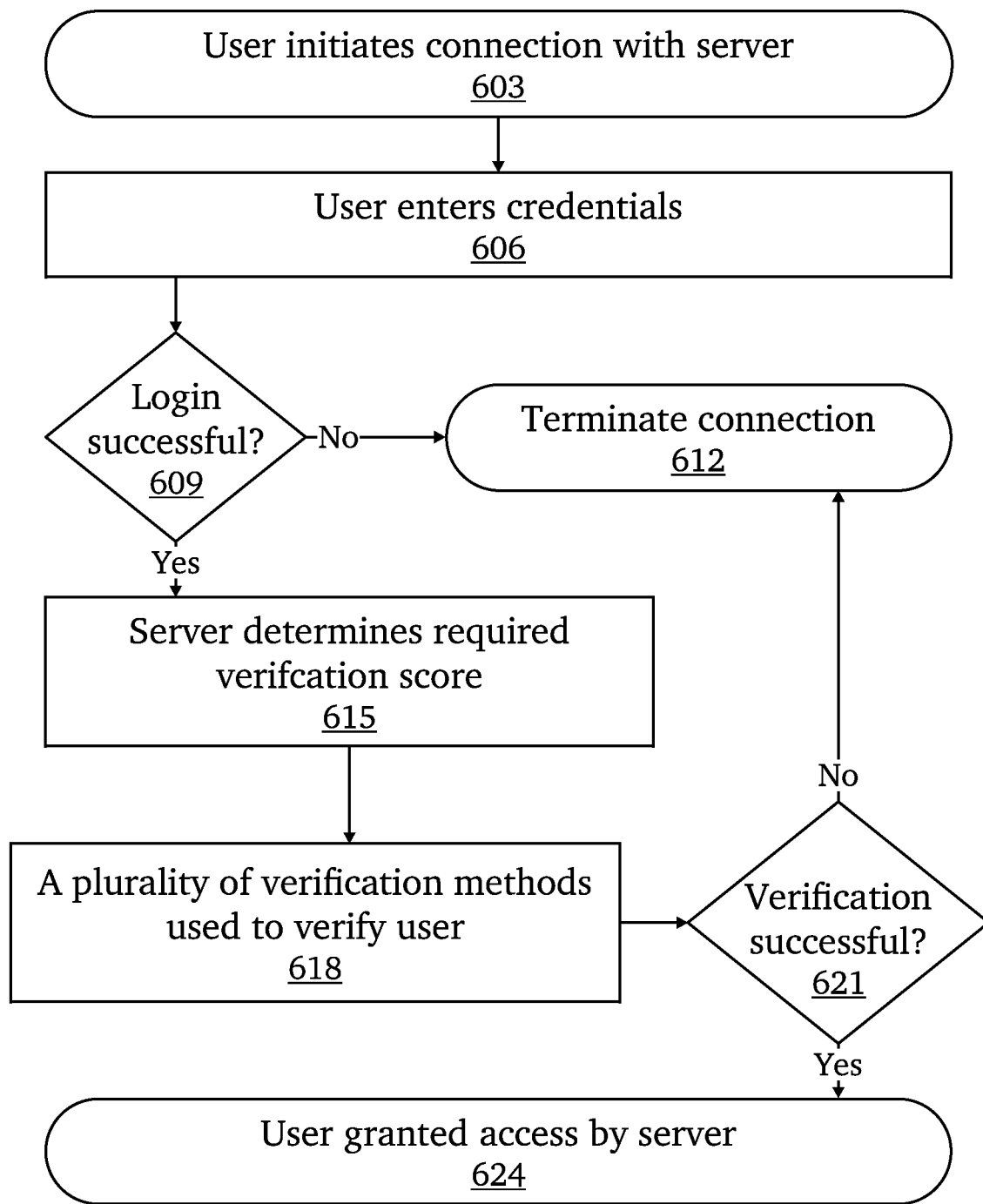
FIG. 6 is a flow chart of an example method to grant user access to a network resource used in various embodiments of the invention.

FIG. 6 is a flow chart of an example method 600 to grant user access to a server used in various embodiments of the invention. At an initial step 603, a user requests access from a server. At step 606, the server requests login credentials from the user. At step 609, if the credential check fails, the connection is terminated at step 612. The server may be configured to institute a certain lockout period after a set number of failed attempts. If the login is successful at step 609, the server dynamically determines a required verification score required before the user can access the server at step 615. The score may be based on, for example, origin of the user connection, whether the connection is determined to be anomalous, security-level of the resource or resources requested by the user, and the like. Other criteria may be found discussed above. At step 618, a plurality of verification methods may be used to verify the user, which may be initiated by either the user or the server, depending on the method used. If the verification is unsuccessful at step 621, the user's connection is terminated at step 612. The verification may fail, for example, if a preset timeout period has been exceeded, or the server has determined that the user attempting to access the server is actually a malicious party. A lockout period may also be instituted here that may take affect after a preset number of attempts. If the verification is successful at step 621, the user is granted access at step 624.

Figure 7:
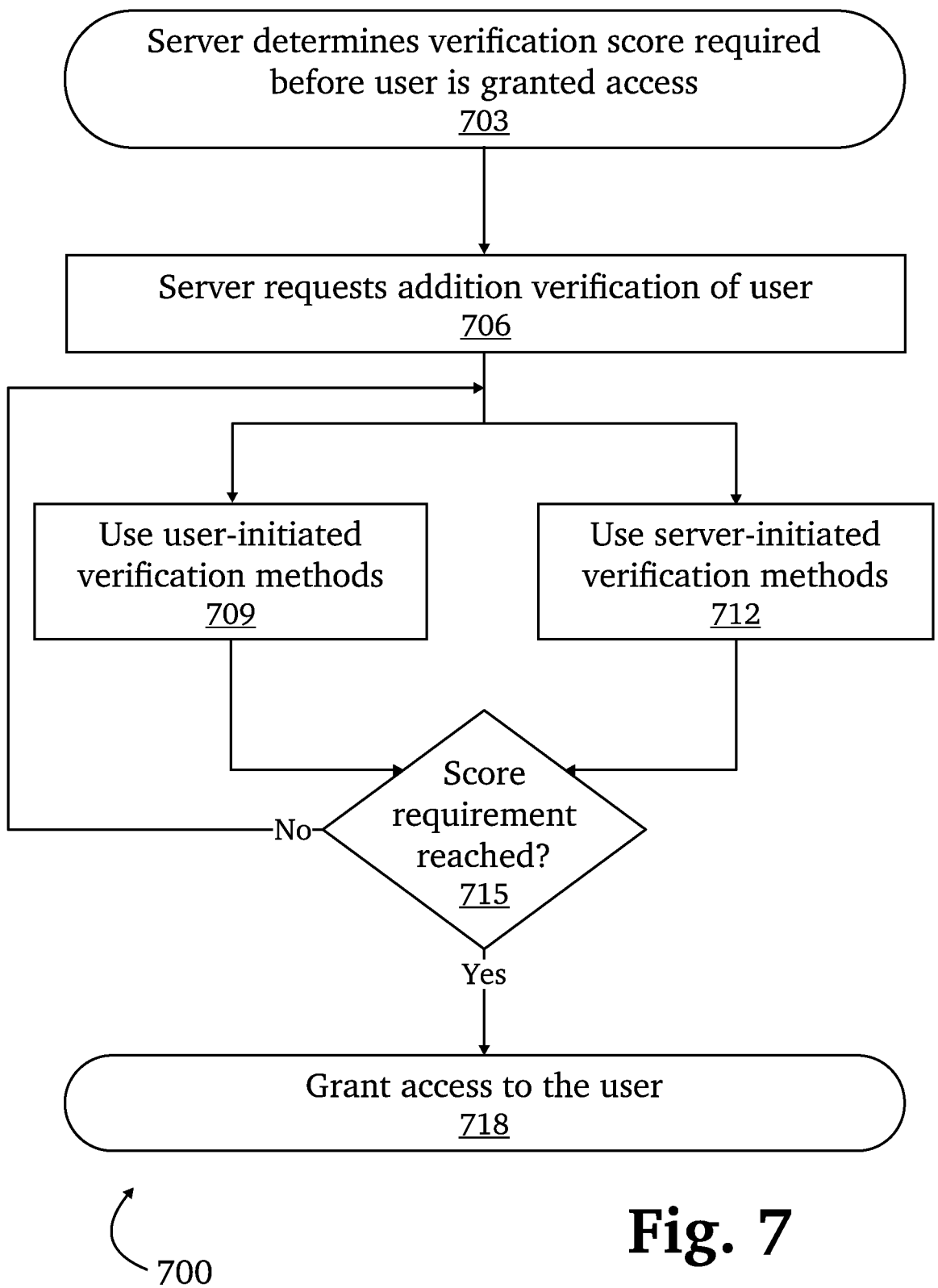
FIG. 7 is a flow chart of an example method for increasing a user's verification score as used in various embodiments of the invention.

FIG. 7 is a flow chart of an example method 700 for increasing a user's verification score as used in various embodiments of the invention. Method 700 may be viewed as a more in-depth description of steps 615, 618, and 624 from method 600. At an initial step 703, the server dynamically determines a required verification score before the user may access the server. As mentioned above, the amount of score required may be based on such metrics as origin of the user's connection, whether the access request is determined to be anomalous by the server based on a predetermined network baseline, accessing files or drives with a higher-level security assignment, and the like. Other metrics are discussed above. At step 706, the server may request additional verification from the user. At step 709, a plurality of verification methods may be initiated by the user, such as, biometric scan on the user's device, employee badge scan, voice recognition, or the like. At step 712, a plurality of verification methods may be initiated by the server, such as, requesting confirmation from trusted and untrusted parties, sending a drone for visual confirmation, analyzing the user's connection and devices, and the like. Steps 709 and 712 may be executed in parallel, or one of the steps may not be executed at all, depending on the situation. At step 715, the system does a check to see whether the user has collected enough verification points. If not, the flow chart loops back to execute steps 709 and/or 712 again. If the score has reached the required level, the user is granted access at step 718.

For brevity, method 700 does not include a fail step for during verification of the user, but it should be understood that various methods may be instituted that may cause the user to fail the verification check, and, thusly, denied access. For example, if a video or picture submitted during the verification process that shows that an unknown party is attempting to masquerade as another user, the verification check may fail immediately. Another method, for example, may be to institute a timeout period to give the user a limited amount of time to earn enough verification points.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
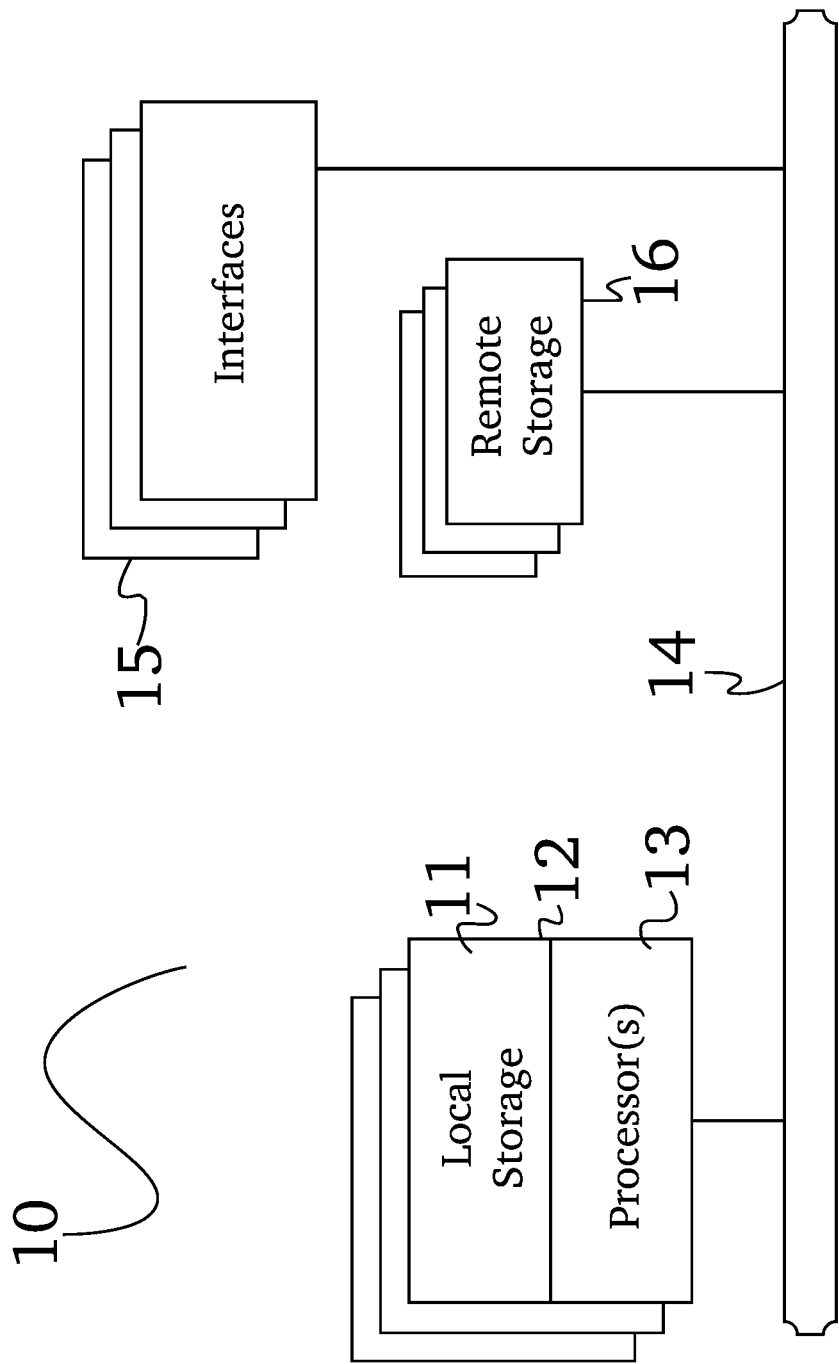
FIG. 8 is a block diagram illustrating an exemplary hardware architecture of a computing device used in various embodiments of the invention.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
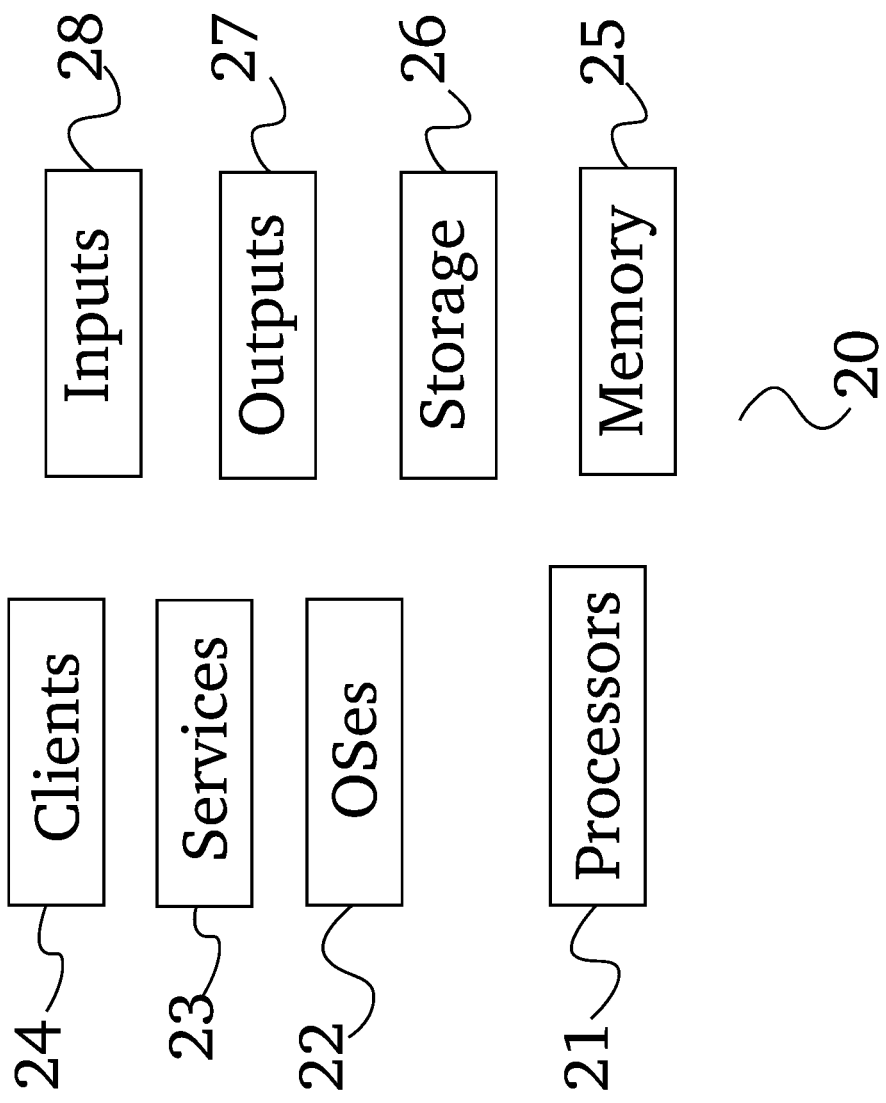
FIG. 9 is a block diagram illustrating an exemplary logical architecture for a client device, according to various embodiments of the invention.

In some aspects, systems may be implemented on a standalone computing system. Referring now to FIG. 9, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
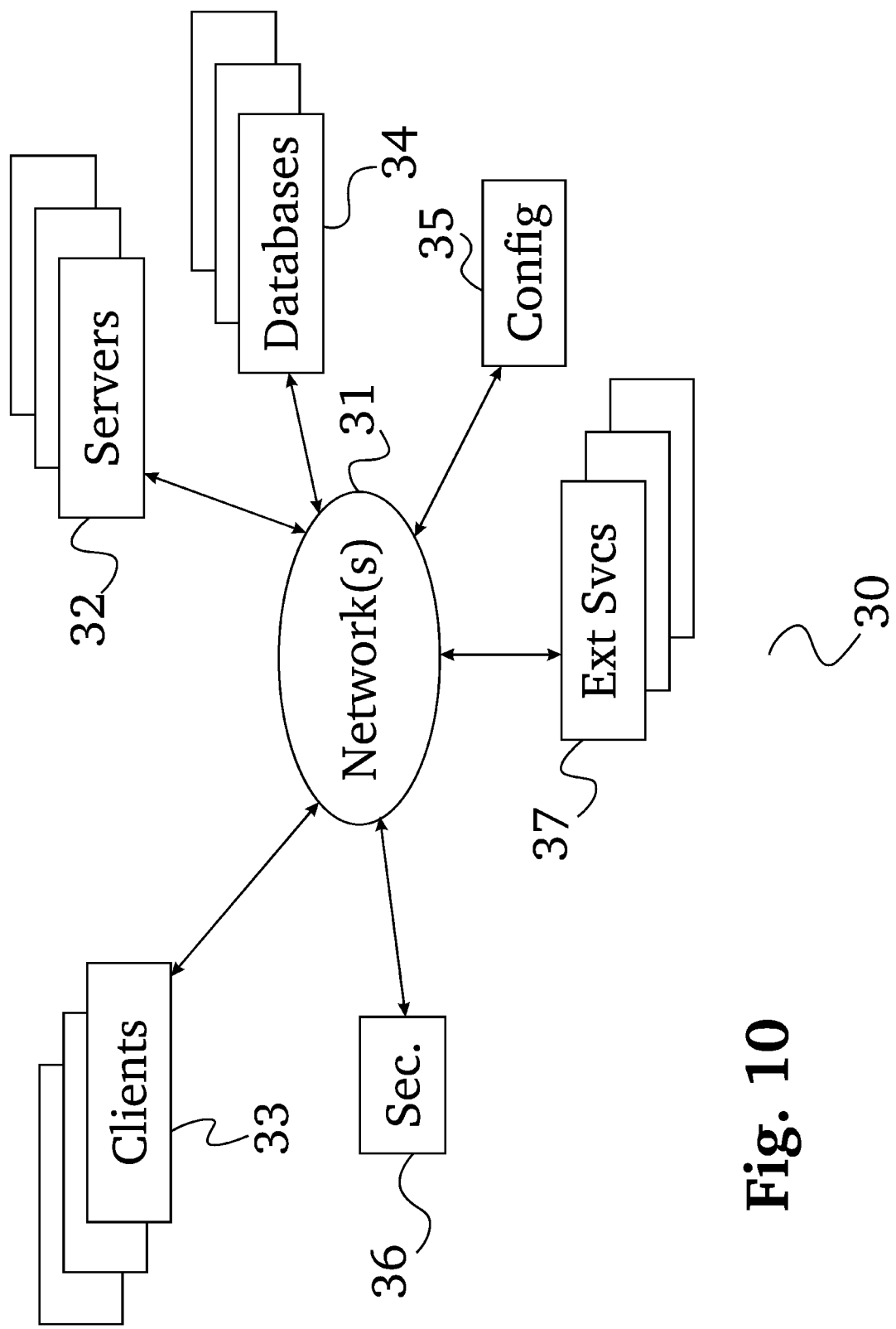
FIG. 10 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 11:
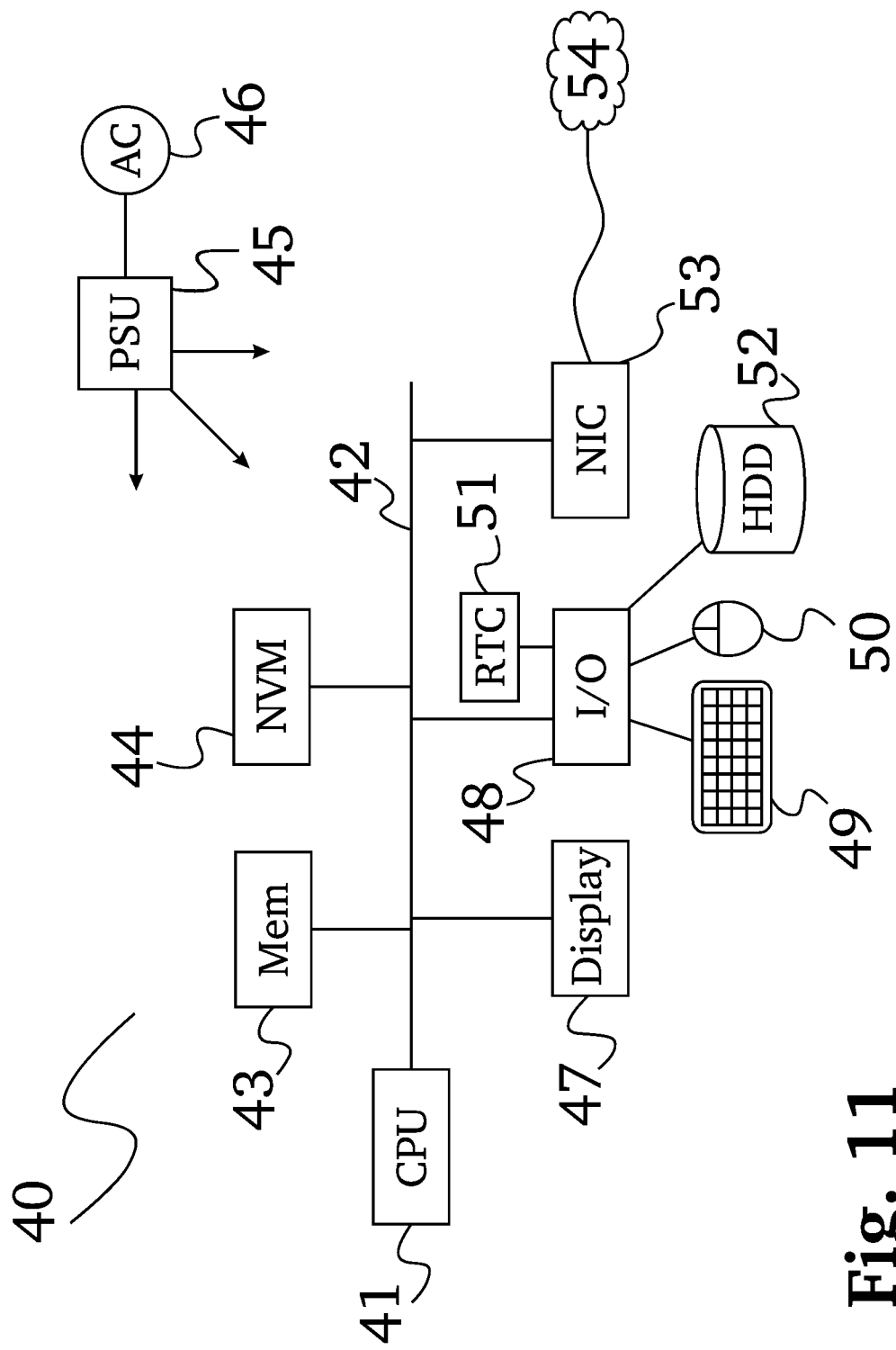
FIG. 11 is another block diagram illustrating an exemplary hardware architecture of a computing device used in various embodiments of the invention.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein.

It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for contextual and risk-based multi-factor authentication, comprising:
    a computing device comprising a memory and a processor, the computing device being connected to a computer network; and
    a validation module comprising a plurality of programming instructions stored in the memory of, and operable on the processor of, the computing device, wherein the plurality of programming instructions, when operating on the processor, causes the computing device to:
        receive time series network traffic data for the computer network;
        establish a baseline network usage profile for a user from the time series data;
        determine a context in which an attempted access to a network resource is made by the user, the context comprising a degree to which the attempted access is determined to be anomalous relative to the baseline network usage profile;
        establish a required verification score for granting the user access to the resource based on the context;
        receive a number of points awarded from the user's successful completion of one or more verification methods; and
        grant access to the network resource when the received number of points is equal to or greater than the verification score.

2. The system of claim 1, wherein the context further comprises a security-level associated with the resource.

3. The system of claim 1, wherein the time series data further comprises the origin of the attempted access.

4. The system of claim 1, wherein one of the verification methods verifies visual media pertaining to a user associated with the credential.

5. The system of claim 1, wherein one of the verification methods checks and verifies biometric features of a user associated with the credential.

6. The system of claim 1, wherein one of the verification methods used is based on information obtained from untrusted parties.

7. The system of claim 1, wherein one of the verification methods used is based on information pertaining to a device used by a user associated with the credential to access the resource.

* * * * *